United States Patent
Maruoka et al.

(10) Patent No.: US 6,488,596 B1
(45) Date of Patent: *Dec. 3, 2002

(54) GOLF BALL WITH HARD THIN COVER

(75) Inventors: Kiyoto Maruoka; Naoki Kato, both of Kobe (JP)

(73) Assignee: Sumitomo Rubber Industries, Limited, Hyogo-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/436,217

(22) Filed: Nov. 9, 1999

(30) Foreign Application Priority Data

Dec. 17, 1998 (JP) .............................. 10-359726

(51) Int. Cl.⁷ .............................................. A63B 37/12
(52) U.S. Cl. ......................................... 473/378; 525/85
(58) Field of Search ................................. 473/377, 378, 473/365

(56) References Cited

U.S. PATENT DOCUMENTS 5,695,414 A    12/1997   Yokota
5,816,943 A  * 10/1998   Masutani ..................... 473/377
6,096,851 A  *  8/2000   Maruoka et al. ............. 473/377

FOREIGN PATENT DOCUMENTS

| JP | 9-59566 A | 4/1997 |
| JP | 09059566 A | * 4/1997 |

* cited by examiner

Primary Examiner—Mark S. Graham
Assistant Examiner—Raeann Gordon
(74) Attorney, Agent, or Firm—Birch, Stewart, Kolasch & Birch, LLP

(57) ABSTRACT

A golf ball having a coating layer which is excellent in resistance to impact, scuffing and abrasion without increasing the thickness of the layer. The coating layer has a hardness of 21 to 60 N/mm², which is calculated by the following expression (1):

$$\text{Hardness} = (\text{test load})/\{26.43 \times (\text{penetration depth (mm)})^2\} \quad (1)$$

wherein the test load is 3 mN.

3 Claims, 1 Drawing Sheet

1: coating layer having a thickness of 5 to 20 μm and a hardness of 21 to 60N/mm²

3: land

2: dimple

GOLF BALL WITH HARD THIN COVER

This application is based on patent application No. 10-359726 filed in Japan, the contents of which are hereby incorporated by references.

FIELD OF THE INVENTION

The present invention relates to a golf ball having a coating layer which is excellent in resistance to impact and scuffing. More particularly, a golf ball having a coating layer which has a high hardness with a small thickness.

BACKGROUND OF THE INVENTION

A golf ball generally has a coating layer enclosing a main body of the golf ball in order to provide gloss to the golf ball surface. However, it is difficult to maintain the gloss for a long time, since the golf ball is used in various severe circumstances. Therefore, the coating layer of the golf ball is required to satisfy the following properties: 1) flexibility capable of preventing cracking even due to extremely large deformation of the ball resulting from, for example, an impact of a driver shot; 2) high scuffing resistance capable of preventing damages due to large friction resulting from an iron shot; 3) high abrasion resistance capable of preventing abrasion due to a bunker shot; 4) high impact resistance capable of preventing peeling of the coating layer from the golf ball main body due to hit by golf clubs; and 5) high waterproof capable of preventing peeling of the coating layer due to use in the rain.

To improve impact and scuffing resistance of a golf ball, Japanese Unexamined Patent Publication No. 9-59566 discloses a coating material for a golf ball obtained by mixing a specified polyurethane polyol with non-yellowing polyisocyanate. However, since the coating material forms a soft coating layer for the purpose of increasing its impact resistance, the formed layer is poor in scuffing and abrasion resistance.

In addition, material for a driver club has recently changed from woods into hard metals such as titanium (Vickers hardness 300), and material for an iron club has also changed from mild steel (Vickers hardness 200) into stainless steel (Vickers hardness 360). These new clubs are likely to cause more severe cracks and abrasion in the golf ball surface than conventional clubs. Thus, a demand has been increasing for a golf ball having increased scuffing and abrasion resistance.

One of the solutions for improving scuffing and abrasion resistance may be to increase the thickness of a coating layer of a golf ball. This solution, however, is likely to deform a dimple structure formed on the golf ball surface and thereby make different flight curve from that of the conventional golf ball. Thus, the golf ball having a thick coating layer may not be for practical use. Also, a thicker coating layer needs higher cost of a coating material for the layer.

SUMMARY OF THE INVENTION

An object of the present invention is to provide a golf ball having a coating layer which is excellent in scuffing and abrasion resistance without increasing the layer thickness.

According to an aspect of the present invention, a golf ball having a main body and a coating layer enclosing the main body. The coating layer has a thickness of 5 to 20 μm and a hardness of 21 to 60 N/mm². The hardness is calculated according to the following expression (1), $$\text{Hardness} = (\text{test load}) / \{26.43 \times (\text{penetration depth (mm)})^2\} \quad (1)$$

wherein the test load is 3 mN.

DETAILED DESCRIPTION OF THE PREFERRED EMBODIMENTS OF THE INVENTION

Figure 1A:
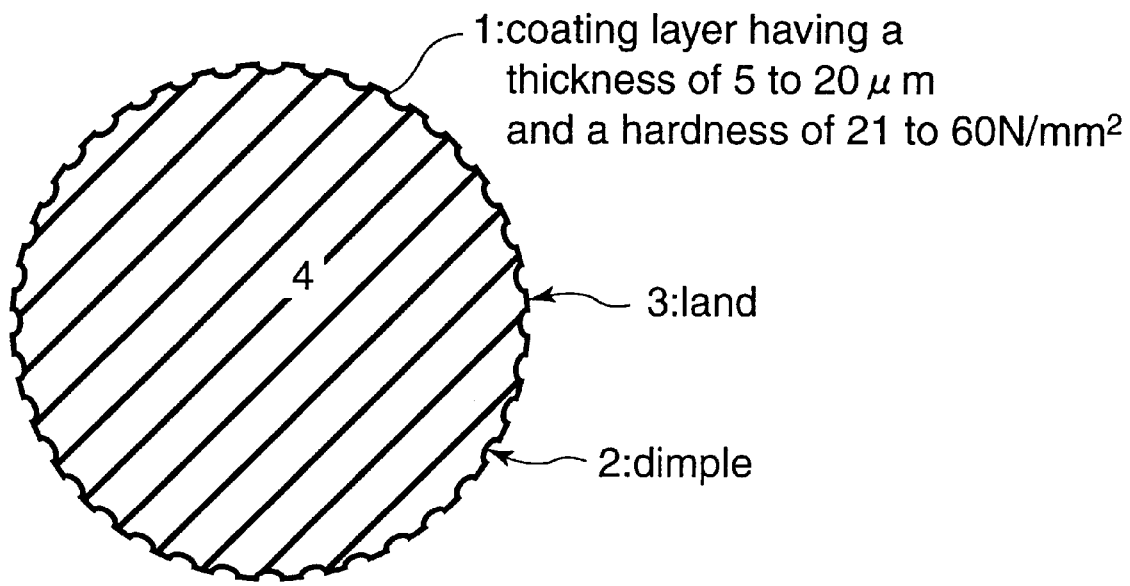
FIG. 1A is a sectional view illustrating a golf ball according to the present invention and FIG. 1B is an enlarged view of FIG. 1A. The golf ball includes a main body 4, and a coating layer 1 enclosing the main body. A plurality of dimples 2 are formed on the surface of the golf ball. The remaining surface, i.e., the surface except dimples, forms a land 3.
Figure 1B:
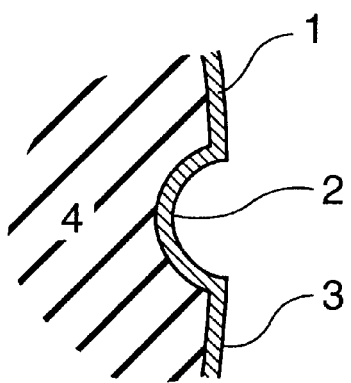

The inventors have attempted to achieve two objects which seem to be incompatible with each other. One of the objects is decreasing the thickness of a coating layer enclosing a golf ball main body, and the other is improving the scuffing and abrasion resistance of a coating layer. As a result, the inventors finally found that one of the solutions for achieving the objects would be specifying a range of the hardness of the coating layer.

One of the main features of the present invention is that the coating layer has a hardness of 21 to 60 N/mm². The hardness in the present invention is calculated according to the following expression (1), when a test load is 3 mN:

$$\text{Hardness} = (\text{test load}) / \{26.43 \times (\text{penetration depth (mm)})^2\}. \quad (1)$$

The hardness of the coating layer in the present invention is measured by using "Fisher Scope H-100 (manufactured by Fisher Instrument Sha)". In the measuring method, the diamond pyramid indenter is set on a land of the golf ball, which the coating layer is formed on the surface thereof, to be penetrated into the coating layer. With a test load of 3 mN applied to the indenter, a penetration depth of the indenter into the coating layer is measured. Then, according to the relationship between the penetration depth and the shape of the indenter, the hardness of the layer (Universal hardness; DIN standard, DIN 50359) is obtained. Specifically, the hardness of the layer is calculated by substituting the test load and the measured penetration depth to the expression (1).

In the case that the hardness is below 21 N/mm², the coating layer is likely to suffer scuffing due to impacts by clubs such as fairway wood and iron. In addition, the coating layer is likely to be worn by friction with sand and iron clubs, especially in bunker shots. On the other hand, in the case that the hardness is above 60 N/mm², a crack in the coating layer is likely to occur due to a decreased flexibility of the layer. This may deteriorate the golf ball appearance, and also cause peeling of the coating layer from the golf ball.

More preferably, the hardness of the coating layer is 30 to 45 N/mm².

The hardness of the coating layer depends on factors such as the curing degree of the coating layer, the properties of components of a coating material forming the coating layer, and molecular weight of the components. Such factors may be adjusted in order to obtain a coating layer having the above-mentioned specified hardness.

As coating material, for example, alkyd resin, phenolic resin, amino resin, aminoalkyd or aminoacrylic resin, unsaturated polyester resin, epoxy resin, polyurethane, chlorinated rubber, acrylic resin, vinyl resin, fluoroethylene resin and the like may be used. However, it should be noted that the coating material of the present invention is not limited thereto. Preferable coating material of these is polyurethan which forms a coating layer having urethane bondings obtained by curing reaction between polyol and polyisocyanate. This is because polyurethan can provide excellent gloss to the resultant coating layer surface.

As examples of the polyisocyanate, there may be aliphatic, alicyclic, and aromatic diisocyanate compounds (i.e., aromatic diisocyanate compounds with or without isocyanate on their side chains) such as hexamethylene diisocyanate (HDI), xylylene diisocyanate (XDI), hydrogenated xylylene diisocyanate ($H_6$XDI), isophorone diisocyanate (IPDI), tetramethyl xylylene diisocyanate (TMXDI), hydrogenated diphenylmethane diisocyanate ($H_{12}$MDI), and tolylenediisocyanate. These can be used solely or in a combination of two or more kinds. In particular, preferable diisocyanate of these is non-yellowing diisocyanate (i.e., aliphatic or alicyclic diisocyanate), because it can provide high weather resistance to the resultant coating layer.

As examples of the polyol, there may be low molecular weight polyols such as diols and triols, and polymer polyols. The diols may include ethylene glycol, diethylene glycol, triethylene glycol, butylene glycol, 1,3-butanediol, 1,4-butanediol, neopentyl glycol, 1,6-hexane glycol and the like. The triols may include glycerine, trimethylol propane, hexanetriol and the like. The polymer polyols may include polyether polyols such as polyethylene glycol, polypropylen glycol and polytetramethylene glycol; polyester polyols such as polyethylene adipate and poly-ε-caprolactone; acrylpolyol obtained by properly introducing hydroxyl groups into acrylic copolymer; polycarbonate diol obtained from cyclic diol; urethane polyol having urethan bondings formed by a reaction between diisocyanate compound and diol/triol.

When polyurethane coating material is used for forming a coating layer on a golf ball surface, the hardness of the coating layer can be adjusted by molecular weight of polyol, i.e., a chief component of polyurethan coating material, and the number of hydroxyl groups contained in polyol. For example, when polyol having larger molecular weight is used to react with isocyanate, the obtained coating layer has a lower hardness due to lower crosslinking density between the polyol and polyisocyanate. On the other hand, when polyol having a smaller molecular weight is used, the obtained coating layer has a higher hardness due to high crosslinking density between the polyol and polyisocyanate. In addition, when polyol contains more diol which has two hydroxyl groups per a molecule, the hardness of the coating layer is lower because diol bonds with isocyanate to form linear polyurethane. When polyol contains more triol which has three hydroxyl groups per a molecule, the hardness of the coating layer is higher because triol bonds with isocyanate to form networks of polyurethane. In this case, however, the coating layer is likely to have a less flexibility, resulting in cracks and peeling in the layer. Therefore, in order that the coating layer has both of high hardness and enough flexibility, preferable equivalent ratio of triol to diol contained in polyol (triol/diol) may be 1.0 to 2.5.

In addition, the equivalent ratio of isocyanate group in polyisocyanate to hydroxyl group in polyol (NCO/OH) is preferably 0.9 to 1.5. When the NCO/OH ratio is less than 0.9, the resultant coating layer is so sticky that dust or blot is liable to adhere to the coating layer. When the NCO/OH ratio is more than 1.5, some isocyanate groups remains unreacted in the produced coating layer. The unreacted isocyanate groups can react with water to produce carbon dioxide, thereby generating bubbles in the coating layer.

If necessary, the coating material of the present invention may further include additives which are generally contained in a coating material for a golf ball such as a silicon-based slipping agent, a leveling agent, a viscosity regulator, a fluorescent brighter, a blocking inhibitor, a curing catalyst, and a color pigment.

A golf ball used in the present invention may include one-piece golf ball which is defined by a single main body, two-piece golf ball whose main body having a core and a cover, and multi-piece golf ball whose main body having a core and a cover in which the core and/or cover are multi-layered.

A one-piece golf ball has a single main body which is generally made from vulcanized rubber composition. The rubber composition includes a base rubber, an organic peroxide as a crosslinking agent, and an unsaturated carboxylic acid and/or metal salt thereof as a co-crosslinking agent.

As examples of the base rubber, diene rubber, which are conventionally used for solid golf balls, may be used. One of preferable examples of the diene rubber is cis-1,4-polybutadiene rubber, which preferably has 40% or more of cis bonds, more preferably 80% or more of cis bonds. If desired, other rubbers including natural rubbers and synthetic rubbers may be added to the base rubber, without impairing the advantageous effect of the present invention. The synthetic rubber may include ethylene-propylene-diene terpolymer (EPDM), butadiene rubber (BR), isoprene rubber (IR), styrene-butadiene rubber (SBR) and acrylonitrile-butadiene rubber (NBR). These can be used solely or in a combination of two or more kinds.

Examples of the organic peroxide include dicumyl peroxide 1.1-bis(t-butyl peroxy)-3,5-trimethyl cyclohexane, 2,5-dimethyl-2,5-di(t-butyl peroxy) hexane, di-t-buthyl peroxide or the like. Preferably, dicumyl peroxide may be used.

Examples of the unsaturated carboxylic acid include α, β-unsaturated carboxylic acids having 3 to 8 carbon atoms per a molecular such as acrylic acid and methacrylic acid. Examples of metal salt of unsaturated carboxylic acid includes mono- or di-valent metal salts such as zinc and magnesium salt. Of these, zinc acrylate may be preferably used, since it can provide high resilience to the obtained coating layer.

Preferable amounts of the above-described essential components of the rubber composition for one-piece golf ball may be 0.3 to 2 parts by weight of organic peroxide (crosslinking agent) and 15 to 50 parts by weight of metal salt of α, β-unsaturated carboxylic acid (co-crosslinking agent) per 100 parts by weight of diene rubber (base rubber).

In addition to the essential components, if necessary, the rubber composition can further include additives which are generally contained in a golf ball such as specific gravity filler, antioxidant, plasticizer, dispersant, ultraviolet absorbent, coloring agent and peptizer. As examples of specific gravity filler, there may be inorganic salts such as zinc oxide, barium sulfate and calcium carbonate; metal powder having high specific gravity such as tungsten and molybdenum powder; and mixtures thereof. As examples of antioxidant, phenol based compounds can be used.

A two-piece golf ball has a main body including a core and a cover. The core is generally formed from a vulcanized rubber composition. The rubber composition for the core is the same as the one for one-piece golf ball, which is described above, except the preferable amounts of essential components such as a base rubber, an organic peroxide (crosslinking agent), and an unsaturated carboxylic acid and/or metallic salt thereof (co-crosslinking agent). In particular, the preferable amount of organic peroxide in the rubber composition for the core may be 0.3 to 2.0 parts by weight, more preferably 0.5 to 2.0 parts by weight, per 100 parts by weight of the base rubber. The preferable amount of unsaturated carboxylic acid and/or metal salts thereof may be 10 to 40 parts by weight, more preferably 10 to 30 parts by weight, per 100 parts by weight of the base rubber. The hardness of the core can be adjusted by properties of the base rubber, degree of crosslinking in the vulcanized rubber and the like.

A cover for two-piece golf ball is mainly made from balata or ionomer, but not limited thereto. Preferably, an ionomeric cover may be used due to its high strength. Preferable ionomers are copolymers of olefine and α, β-etylemically unsaturated carboxylic acid with a portion of the carboxylic acid groups neutralized by a metal ion. Examples of the metal may include monovalent metal such as sodium, potassium and lithium; divalent metal such as zinc, calcium, magnesium, copper and manganese; trivalent metal such as aluminum and neodymium. Preferably, sodium, lithium, zinc and magnesium may be used, since the copolymers neutralized by these metal ion has a high hardness and resilience. The most preferable metal may be zinc. This is because zinc ion may contribute to forming aggregates to maintain high strength of the ionomeric cover.

If necessary, additives such as coloring agent, antioxidant, plasticizer, dispersant, light stabilizer and ultraviolet absorbent can be added to the ionomer to prepare a cover composition.

The process for forming a cover onto a core may include 1)preparing a cover composition by mixing an ionomer and desired additives with heat at 150 to 250° C. for 0.5 to 15 minutes in an internal mixer such as biaxial kneading and extruding machine, Banbury mixer and kneader; 2) forming the cover composition on the core surface directly or via another layer. The forming step may include any known method. The cover composition may be pre-formed into a set of two half-spherical shells. Then the core is put into one of the half-spherical shells, followed by covering the core with the other half-spherical shell with heat at 130 to 170° C. for 1 to 15 minutes in such a manner that the set of shells encloses the core in the shape of a sphere. Alternatively, the cover may be formed on the core surface by injection molding.

In forming the cover, dimples may be impressed on the cover surface. The number of dimples may be 360 to 450, preferably 370 to 420 per a golf ball.

The thickness of the golf ball cover formed in the above-described process is preferably 1.0 to 1.8 mm, more preferably 1.3 to 1.6 mm. The cover having a thickness less than 1.0 mm is likely to decrease the spin rate of the golf ball by short iron stroke, resulting in a decreased controllability of the golf ball. On the other hand, the cover having a thickness more than 1.8 mm is likely to decrease a resilience of the golf ball, resulting in a decreased flying distance.

To the surface of a golf ball main body, e.g., to the cover surface of a two-piece golf ball, the above-described coating material can be applied by any known method such as spray gun coating and electrostatic coating. When the coating material is polyurethane two pack coating material consisting of separate packages of the polyol and the diisocyanate components, the two components can be mixed in advance or immediately before applied to the ball surface.

The applied coating material is cured by drying to form a coating layer. The drying temperature is preferably below 50° C., but not limited thereto. The drying time can be determined according to coating material components. The preferable drying time is 0.5 to 5 hours.

In the present invention, the obtained coating layer preferably has a thickness of 5 to 20 μm. This thickness is less than the thickness of a coating layer of the conventional golf ball, which is 15 to 30 μm. The term "thickness of a coating layer" represents an average value of the measured thickness at 10 and points and 10 dimple bottom points.

As described above, according to the present invention, a golf ball having a coating layer which is excellent in scuffing and abrasion resistance with a small thickness can be provided by specifying the range of a hardness of the coating layer.

EXAMPLES

[Production of Golf Ball Main Body]

A rubber composition for a core was prepared by mixing 100 parts by weight of cis-1,4-polybutadiene rubber ("BR11" manufactured by JSR Co., Ltd), 36 parts by weight of zinc acrylate, 16 parts by weight of zinc oxide and one part by weight of dicumyl peroxide. The composition was compressed and vulcanized at 160° C. for 20 minutes to form cores having a diameter of 38.4 mm.

On the other hand, to prepare a cover composition, mixed were 50 parts by weight of "Himilan 1605" (sodium neutralized ethylene-methacrylic acid copolymer-based ionomer: manufactured by Mitsui DuPont Chemical Co., Ltd.), 50 parts by weight of "Himilan 1705" (zinc neutralized ethylene-methacrylic acid copolymer-based ionomer: manufactured by Mitsui DuPont Chemical Co., Ltd.), and two parts by weight of titanium oxide.

The cover composition is injected on the core surface to produce a main body having a diameter of 43 mm and 360 dimples.

[Preparation of Coating Material]

Coating materials "a" to "g" according to the present invention and Comparative coating materials "A" and "B" were prepared as follows.

In the following preparation, polytetramethylene glycol (Mw=650; manufactured by BASF Co. Ltd.) was used as diol and trimethylol propane (manufactured by Koei Kagaku Co. Ltd.) was used as triol.

A mixture of diol and triol at the equivalent ratio shown in Table 1 was diluted with toluene (i.e., a solvent) to prepare polyol solution having 30% of solid concentration, and 0.02 wt % of dibutyltin laurate was added as a curing catalyst to the polyol solution to prepare a chief component of the coating material.

To prepare a curing agent for the coating material, hexamethylene diisocyanate "N3500" (manufactured by Sumitomo Bayer Urethane Co. Ltd.) was diluted with toluene to prepare diisocyanate solution having 60% of solid concentration.

The obtained chief component and curing agent were mixed at the equivalent ratio of the isocyanate group in the curing agent to the hydroxyl groups in the chief component (i.e., NCO/OH) is 1.2.

[Production of Golf Ball]

The mixture of the chief component and the curing agent was applied to the surface of the golf ball main body by an air gun moving up and down, with the main body rotating at a rate of 150 rpm, to form a coating layer on the main body surface. Then, the coating layer was cured at 50° C. for 120 minutes to produce golf balls Nos.1 to 9, which respectively had coating layers made of coating material "a" to "g" and "A" to "B".

[Evaluation Method]

The following evaluation tests were made to the obtained golf ball Nos.1 to 9. The same evaluation tests were made to two two-piece golf balls obtained from the market (Nos. 10 and 11), both of which had a layer of the conventional coating material. The results of the evaluation tests were shown in Table 1.

(Hardness of Coating Layer)

The hardness of the coating layer was measured according to DIN standard, DIN 50359. In particular, it was measured by using "Fisher Scope H-100 (manufactured by Fisher Instrument Sha)". In the measuring method, with a load of 3 mN applied to diamond pyramid indenter, a penetration depth of the indenter into the coating layer was measured. Then, according to the following expression (1), the hardness of the layer was calculated from the measured penetration depth.

$$\text{Hardness} = (\text{test load}) / \{26.43 \times (\text{penetration depth (mm)})^2\}. \quad (1)$$

(Abrasion and Scuffing Resistance)

After the golf balls were subjected to sand blasting for 5 minutes, the golf balls were visually checked to see the surface state of their respective coating layers, and then classified into four categories in accordance with the surface state as follows:

⊚: no peeling was observed;

○: a portion at a dimple edge was worn so that a surface of the cover could be seen through the worn coating layer;

Δ: a portion from a dimple edge to a land was worn so that a surface of the cover was exposed;

X: a portion at a bottom of some dimples was peeled.

(Impact Resistance)

Each of the golf balls were hit one hundred times by a driver mounted on the swing machine manufactured by True Temper Co., Ltd. at a head speed of 45 m/sec. Then the surface of the golf balls was visually checked to see the state of peeling and cracking/checking, and classified into four categories in accordance with the state of peeling and cracking/checking as follows:

⊚: no cracking/checking and peeling was observed;

○: cracking/checking in size of below 0.5 mm was observed in part of the ball surface, but no peeling was observed;

Δ: cracking/checking in size of below 0.5mm was observed over the ball surface, but no peeling was observed; and X: cracking in size of about 1 mm was observed over the ball surface, and peeling was also observed in part of the ball surface.

TABLE 1

| Golf ball No | Coating material | Triol/diol | Thickness (μm) | Hardness (N/mm²) | Abrasion/Scuffing resistance | Impact resistance |
|---|---|---|---|---|---|---|
| 1 | a | 1.0 | 13 | 21.4 | ○ | ⊚ |
| 2 | b | 1.2 | 13 | 28.1 | ⊚ | ⊚ |
| 3 | c | 1.5 | 13 | 38.5 | ⊚ | ⊚ |
| 4 | d | 1.8 | 13 | 45.7 | ⊚ | ⊚ |
| 5 | e | 2.3 | 13 | 58.6 | ⊚ | ⊚ |
| 6 | f | 1.5 | 7 | 38.5 | ⊚ | ⊚ |
| 7 | g | 1.5 | 18 | 38.5 | ⊚ | ○ |
| 8 | A | 3.0 | 13 | 69.5 | ⊚ | Δ |
| 9 | B | 3.3 | 13 | 89.0 | ⊚ | x |
| 10 | Conventional | — | 20 | 14.1 | Δ | ⊚ |
| 11 | Conventional | — | 18 | 13.1 | Δ | ⊚ |

As can be seen from Table 1, golf balls according to the present invention (Nos.1 to 7), which were respectively coated with coating materials "a" to "g", provided good results in both abrasion/scuffing resistance and impact resistance. On the contrary, the golf balls coated with the coating materials having a higher hardness than 60 N/mm² (Nos.7 and 8) had a low impact resistance, although they had a satisfactory abrasion and scuffing resistance. On the other hand, the golf balls coated with the conventional coating material having a lower hardness than 21 N/mm² (Nos.9 and 10) had a low abrasion and scuffing resistance, although they had satisfactory impact resistance.

Although the present invention has been fully described by way of example, it is to be understood that various changes and modifications will be apparent to those skilled in the art. Therefore, unless otherwise such changes and modifications depart from the scope of the present invention, they should be construed as being included therein.

What is claimed is:

1. A golf ball comprising:

a main body; and a coating layer enclosing the main body, wherein the coating layer is formed from a polyurethane comprising a polyisocyanate and a triol and diol in an equivalent ratio of triol to diol of 1.0 to 2.5, said coating layer having a thickness of 5 to 20 μm and a hardness of 21 to 60 N/mm², the hardness being calculated according to the following expression (1), $$\text{Hardness} = 3\,\text{mN} / \{26.43 \times (\text{penetration depth (mm)})^2\} \quad (1)$$

wherein the penetration is effected in a land area of said coating layer by a diamond pyramid indenter loaded with a 3 mN test load.

2. A golf ball according to claim 1, wherein the hardness of the coating layer is 35 to 45 N/mm².

3. A golf ball according to claim 1, wherein an equivalent ratio of isocyanate group in the polyisocyanate to hydroxyl group in the polyol (NCO/OH) is 0.9 to 1.5.

* * * * *